Aug. 7, 1962 E. L. CAPENER ET AL 3,048,076
METHOD OF INHIBITING PROPELLENT GRAIN CRACKING
Filed Dec. 9, 1958

INVENTORS.
ERWIN L. CAPENER
DOUGLAS D. ORDAHL
SYDNEY SHEFLER
BY
*J. M. St. Amand*
ATTORNEYS.

United States Patent Office 3,048,076
Patented Aug. 7, 1962

3,048,076
METHOD OF INHIBITING PROPELLENT GRAIN CRACKING
Erwin L. Capener, Ridgecrest, and Douglas D. Ordahl and Sydney Shefler, China Lake, Calif., assignors to the United States of America as represented by the Secretary of the Navy
Filed Dec. 9, 1958, Ser. No. 779,260
12 Claims. (Cl. 86—1)
(Granted under Title 35, U.S. Code (1952), sec. 266)

The invention described herein may be manufactured and used by or for the Government of the United States of America for governmental purposes without the payment of any royalties thereon or therefore.

The present invention relates to propellent grains and more particularly to a method of inhibiting, or curbing, or restraining propellent grains from cracking due to thermal or design stresses.

It is the purpose of the present invention to relieve the stresses induced in an internal burning propellent grain of internal star perforation cross-section and to strengthen the grain. Stresses may come about in a propellent grain because of the design of the grain, from the processing used in making the grain, or from thermal cycling. By means of the present invention thermal cycling is permitted and the use of propellent grains at extremely low temperatures is capable without cracking and malfunctioning of the grains.

This new method of inhibiting the cracking of propellent grains comprises applying a coating of crack inhibiting material to those portions of the internal star perforations of propellent grains where stresses are most concentrated. There are no other known methods of achieving this purpose that do not require redesign of the propellent grain or improvement of the physical properties of the propellant, or both. Redesigning the grain or improving the physical properties of the propellant would require extensive development and time, and normally prohibitive expenses.

It is an object of the invention therefor to provide a method for relieving the stresses induced in an internal burning propellent grain of internal star perforation cross-section.

It is another object of the invention to provide a method for strengthening a propellent grain for use at extremely low temperatures without malfunctioning.

It is still another object of the invention to provide a method of treating propellent grains to curb cracking due to thermal stresses.

It is a further object of the invention to provide a method of inhibiting propellent grains from cracking due to stresses caused by design or processing of the grains.

A still further object of the invention is to provide a method of treating propellent grains which allows thermal cycling without cracking of the grains.

Other objects and many of the attendant advantages of this invention will be readily appreciated as the same becomes better understood by reference to the following detailed description when considered in connection with the accompanying drawings wherein.

Referring now to the drawing, like numerals refer to like parts in each of the figures.

Figure 1:
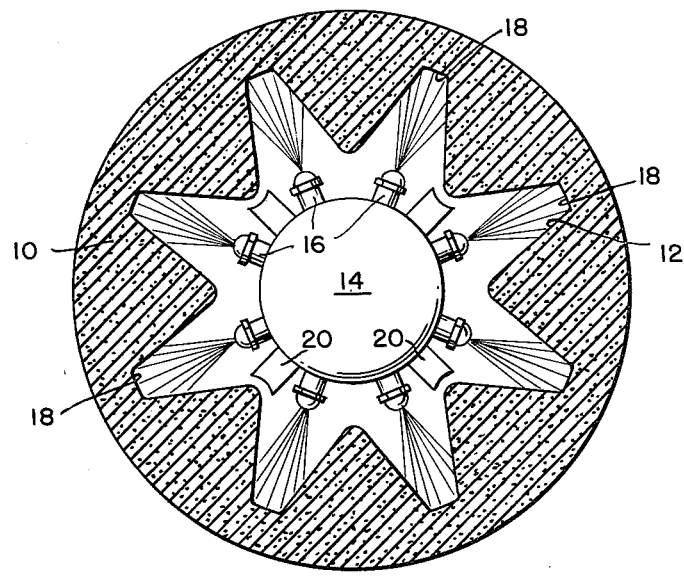
FIG. 1 is a plan view showing a propellent grain in cross-section with a special nozzle sprayhead coating the inner surface of the grain perforation.
Figure 2:
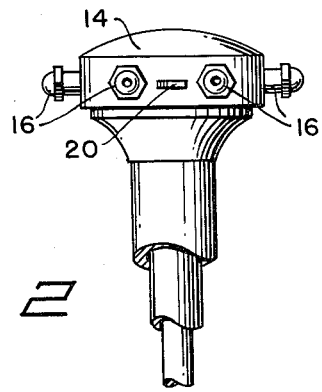
FIG. 2 is an elevational view of the nozzle sprayhead of FIG. 1 used for spray coating an inhibitor on the inner surface of the grain.

Propellent grain 10, as illustrated in cross-section in FIG. 1, has an internal perforation 12 therethrough. In the example, illustrated perforation 12 is in the shape of an eight point star, however, any shape perforation may be treated by the present method. A nozzle head 14 of such size as to fit within the grain perforation 12 is used when an inhibitor coating is to be sprayed on the internal surface of the grain, and has a plurality of nozzles 16 equal in number to the grooves 18 along the internal wall of the propellent grain. The inhibiting or restraining coating may be applied to the propellent grain by pouring, brushing, roller coating and the like, as well as by spraying which is used as an illustrative example. When spraying, a nozzle head with the appropriate number of nozzles is used to sufficiently coat each groove along the interior surface of the grain. Guides 20 may be used for properly positioning the nozzle head within the grain perforation.

The present method involves the application of a lacquer or some other polymeric material in solvent solution to those portions of the internal perforation of propellent grains where stresses are most concentrated. It is believed that the material applied fills any minute scratches and cracks, and thereby eliminates points at which stresses can concentrate. The solvent functions also in strengthening the propellent grain at the weakest points, i.e., the grooves where the radial thickness of the grain is least.

The following is a typical example of the application of this invention: The inhibiting material, a 5% ethyl cellulose lacquer which consists of 5% ethyl cellulose flake in a solvent solution of 65% N-butanol and 35% ethyl lactate, is applied to the internal perforation 12 of a propellent grain 10 by spraying into the radii grooves 18 and coating only the bottom wall portions thereof, as illustrated in FIG. 1, through a special nozzle sprayhead 14 designed for use with the configuration of the perforation in the propellent grain. Either manual or machine operation of the nozzle sprayhead is feasible. Typical processing conditions are as follows: lacquer pressure=20 p.s.i.g., air pressure=35 p.s.i.g., application rate=131 grams/minute, temperature=75° F. The optimum lacquer thickness varies from 0.001 inch to 0.004 inch with a diffusion layer extending into the propellant from 0.015 inch to 0.040 inch. To obtain these thicknesses by spraying, several spray passes are normally required. This may be accomplished in a single coating by the pour coating method.

This invention permits the use of propellent grains at extremely low operating temperatures without malfunctioning. With double-base propellants, the lower service limits have been extended from about −45° F. to −75° F. Other methods of accomplishing this have been unsuccessful.

Obviously, many modifications and variations of the present invention are possible in the light of the above teachings. It is therefore to be understood that within the scope of the appended claims the invention may be practiced otherwise than as specifically described.

We claim:

1. The method of inhibiting a propellent grain of internal star perforation cross-section from cracking due to thermal stresses comprising applying a coating of inhibiting material composed of a polymeric material in solvent solution to the bottom wall portions of the grooves of the internal perforation of the propellent grain where stresses are most concentrated.

2. The method of inhibiting a propellent grain of internal star perforation cross-section from cracking due to thermal stresses comprising applying a coating of inhibiting material composed of a 5% ethyl cellulose lacquer to the bottom wall portions of the grooves of the internal perforation of a propellent grain where stresses are most concentrated.

3. The method of inhibiting a propellent grain of internal star perforation cross-section from cracking due to thermal stresses comprising applying a coating of inhibiting material composed of 5% ethyl cellulose flakes in a solution of 65% N-butanol and 35% ethyl lactate to the bottom wall portions of the grooves of the internal perforation of a propellent grain where stresses are most concentrated.

4. A propellent grain formed with an internal star perforation cross-section having alternating points and grooves, the bottom wall portions of the grooves being coated with a material composed of 5% ethyl cellulose flakes in a solution of 65% N-butanol and 35% ethyl lactate.

5. The method of curbing a propellent grain of internal star perforation from cracking due to thermal stresses comprising applying a coating of material consisting of a polymeric material in solvent solution to the groove bottom portions of the internal star perforation of a propellent grain where stresses are most concentrated, said coating being applied at an optimum thickness which varies from 0.001 to 0.004 inch and with a diffusion layer extending into the propellant from 0.015 to 0.040 inch.

6. The method of inhibiting a propellent grain of internal star perforation from cracking due to thermal stresses comprising applying a coating of inhibiting material consisting of a polymeric material in solvent solution to the groove bottom portions of the internal star perforation of the propellent grain where stresses are most concentrated, spraying on said coating of inhibiting material through a spray nozzle with an air pressure of 35 p.s.i.g., an inhibiting material pressure of 20 p.s.i.g., an application rate of 131 grams/minute, and temperature of 75° F.

7. The method of inhibiting a propellent grain of internal star perforation from cracking due to thermal stresses comprising applying a coating of inhibiting material consisting of a 5% ethyl cellulose lacquer to the bottom wall portions of the grooves of the internal star perforation of a propellent grain, said inhibiting material coating being applied at an optimum thickness which varies from 0.001 to 0.004 inch and with a diffusion layer extending into the propellant from 0.015 to 0.040 inch.

8. The method of curbing a propellent grain of internal star perforation from cracking due to thermal stresses comprising applying a coating of material consisting of a 5% ethyl cellulose lacquer to the bottom wall portions of the grooves of the internal star perforation of a propellent grain, spraying on said coating of material through a spray nozzle with an air pressure of 35 p.s.i.g., a material pressure of 20 p.s.i.g., an application rate of 131 grams/minute, and temperature of 75° F.

9. The method of inhibiting a propellent grain of internal star perforation from cracking due to thermal stresses comprising applying a coating of inhibiting material composed of 5% ethyl cellulose flakes in a solution of 65% N-butanol and 35% ethyl lactate to the bottom wall portions of the grooves of the internal star perforation of a propellent grain, said inhibiting material coating being applied at an optimum thickness which varies from 0.001 to 0.004 inch and with a diffusion layer extending into the propellant from 0.015 to 0.040 inch.

10. The method of inhibiting a propellent grain of internal star perforation from cracking due to thermal stresses comprising applying a coating of inhibiting material composed of 5% ethyl cellulose flakes in a solution of 65% N-butanol and 35% ethyl lactate to the bottom wall portions of the grooves of the internal perforation of a propellent grain, spraying on said coating of inhibiting material through a spray nozzle with an air pressure of 35 p.s.i.g. an inhibiting material pressure of 20 p.s.i.g., an application rate of 131 grams/minute, and temperature of 75° F.

11. A propellent grain formed with an internal star perforation comprising grooves, and the bottom wall portions of the grooves being coated with a material for strengthening the grain and for inhibiting cracking due to thermal stresses, said material being composed of 5% ethyl cellulose flages in a solution of 65% N-butanol and 35% ethyl lactate, the optimum thickness of said coating varying from 0.001 to 0.004 inch with a diffusion layer extending into the propellant from 0.015 to 0.040 inch.

12. The method of curbing cracking in a propellant grain of the type having an inner wall made up of a plurality of points and grooves, said method comprising coating only the bottom wall portions of said grooves with an inhibiting material consisting essentially of 5% ethyl cellulose flakes in a solvent solution of 65% N-butanol and 35% ethyl lactate.

References Cited in the file of this patent

UNITED STATES PATENTS

| 2,563,265 | Parsons | Aug. 7, 1951 |
| 2,643,611 | Ball | June 30, 1953 |
| 2,858,289 | Bohn et al. | Oct. 28, 1958 |
| 2,877,504 | Fox | Mar. 17, 1959 |

OTHER REFERENCES

Article in "Jet Propulsion" by J. M. Vogel, pages 102 to 105, published February 1956.